United States Patent Office 2,955,092
Patented Oct. 4, 1960

2,955,092

CURED REACTION PRODUCT OF UNSATURATED ACETAL, POLYHYDROXYALCOHOL AND CELLULOSE AND PROCESS FOR PREPARING SAME

Donald E. Hudgin, Summit, N.J., assignor to Celanese Corporation of America, New York, N.Y., a corporation of Delaware No Drawing. Filed Apr. 9, 1957, Ser. No. 651,573

14 Claims. (Cl. 260—17.4)

This application relates to resins produced from unsaturated polyacetals and polyhydroxy alcohols and more particularly to resins produced with cellulose as a polyhydroxy alcohol.

It is known that hard, tough resinous polymers may be produced by reacting an unsaturated polyacetal, such as diallylidene pentaerythritol with certain polyhydroxy alcohols. The suitable polyhydroxy alcohols have been found to be those with at least two but not more than six hydroxy groups having at least two hydroxy groups separated from one another by a carbon bridge of at least three carbon atoms. Among the specific polyhydroxy alcohols disclosed are the hexa-hydroxy sugar alcohols such as mannitol, sorbitol and dulcitol; and trimethylol propane, trimethylol ethane 2,3,5,6-tetramethylol-1,4-hydroquinone dimethyl ether and 2,4-hydroxy-3 hydroxmethyl pentane.

It has been found that polyhydroxy alcohols containing more than six hydroxy groups are generally not suitable. For example, sucrose and amylose do not react with diallylidene pentaerythritol under conditions effective for the reaction of the above-mentioned polyhydroxy alcohols and cellulose reacts with diallylidene pentaerythritol to produce a white, brittle and fragile product.

In accordance with this invention, it has been found that, while cellulose, as the sole polyhydroxy alcohol produces the aforesaid brittle and fragile product, it may be substiuted for a portion of the polyhydroxy alcohol normally used to produce a tough, useful resin.

In the preferred embodiment of this invention, the unsaturated diacetal is combined with a less than stoichiometric amount of polyhydroxy alcohol and a suitable catalyst and is precured at a temperature above the fusion point of the mixture but below about 100° C. The precured resin is then combined with cellulose and the curing is continued, under pressure, if desired, for a period between about 12 and 24 hours at a temperature between about 70 and 120° C.

The diacetals which may be used in accordance with this invention are those prepared from pentaerythritol and from anhydroenneaheptitol and an α,β-ethylenically unsaturated aliphatic aldehyde preferably a straight chain α,β-ethylenically unsaturated aldehyde having not more than four carbon atoms. Pentaerythritol forms diacetals with acrolein and crotonaldehyde, for example, in the presence of a small amount of acid, such as phosphoric acid, as catalyst. The diacetals formed are diallylidene pentaerythritol and dicrotonallylidene pentaerythritol, respectively. Anhydroenneaheptitol forms similar diacetals. A complete description of a preferred method of preparing the unsaturated diacetals of pentaerythritol used in this invention may be found in copending United States application Serial Number 550,757, filed by Raymond J. Kray and Frank Brown on December 2, 1955, now U.S. Patent 2,915,530. A description of a preferred method of preparing the unsaturated diacetals of anhydroenneaheptitol may be found in United States application Serial Number 651,572, filed by Donald E. Hudgin concurrently herewith.

The polyhydroxy alcohols, used in addition to cellulose, in accordance with this invention are those having at least two but no more than six hydroxy groups and having at least two hydroxy groups separated from each other by a carbon bridge of at least three carbon atoms. Among the specific polyhydroxy alcohols which may be used are trimethylol propane; trimethylol ethane; 2,3,5,6-trimethylol - 1,4 - hydroquinone dimethylether; 2,4-dihydroxy - 3 - hydroxymethyl pentane; glycerine; 1,2,6-hexanetriol; 1,2,4-butanetriol; methyl glucoside; and dextrose. Among the most useful of the polyhydroxy alcohols are the hexa-hydroxy sugar alcohols such as mannitol, sorbitol and dulcitol. Of these sorbitol is preferred because of its greater solubility in the unsaturated diacetal and because of the superior physical properties of the resins produced.

The aforementioned polyhydroxy alcohols are combined in less than stoichiometric amounts with the unsaturated polyacetals in accordance with this invention in order to permit reaction with the hydroxy groups of the cellulose to take place. Instead of an equivalent amount of polyhydroxy alcohols and unsaturated diacetals, based upon hydroxy groups per double bond, a lesser amount, from about 0.4 to about 0.9 equivalent, is used. It is preferred that an amount between about 0.5 to about 0.7 equivalent be used.

Any of the known catalysts of acidic nature known to be effective for the production of resins from unsaturated diacetals and polyhydroxy alcohols may be used as a catalyst in accordance with this invention. Among the classes of catalysts which may be used are the boron fluoride complexes, such as boron fluoride hydrate, boron fluoride etherate and boron fluoride acetic acid complexes; organic sulfonic acids, such as p-toluene sulfonic acid, d-camphor sulfonic acid, 2-chlorcymol sulfonic acid, ethane sulfonic acid and m-benzene sulfonic acid; and tin chloride complexes such as tin chloride-hydrochloric acid hexahydrate. The amount of catalyst added depends on the activity of the catalyst and upon the rapidity of curing desired. With a boron fluoride complex as little as a few thousandths of one percent by weight may be used. With other catalysts the amount may be as high as 1 or 2 percent by weight. Generally, it is preferred to use amounts between about 0.2 and about 1.0% by weight.

After the unsaturated diacetal, the polyhydroxy alcohol and the catalyst are combined, the admixture is fused and permitted to precure for a period between about 0.5 to about 1.0 hour at a temperature above the fusion point but below about 100° C. The precured mixture is then combined with cellulose.

The cellulose used in accordance with this invention may be in any convenient form such as wood flour, shredded rags, shredded paper, cotton flock, fiber cotton, wood pulp, cellulose mats, canvas or paper. From about 0.3 to about 2.0 equivalents of cellulose per equivalent of original unsaturated diacetal, based upon hydroxy groups per double bond are used. The excess cellulose, if any, acts as a filler in the resin.

The cellulose, if finely divided is added to the precured resin. Otherwise the precured resin is impregnated into the cellulose, as for example in the case of cellulose mats. The curing is then continued at a temperature between about 80° C. and about 120° C. for a period between about 12 and 24 hours. The temperature may vary within the above range at various stages in the cure and the resin may be subjected to pressure, if desired, during at least a portion of the curing process. The curing catalyst in the original admixture remains effective for the final cure, although if desired, additional catalyst may be added.

EXAMPLE I

Diallylidene pentaerythritol (159 parts by weight) sorbitol (27 parts by weight) and ethane sulfonic acid (1 part by weight) were stirred together in an open flask at 90° C. The mixture became homogeneous after about 45 minutes and was then poured onto three 1/8" thick sheets of cellulose mat (about 58 sq. in. total for each 100 g. of mixture). The resin saturated sheets were then placed in an oven at 80° C. for 4 hours. The laminate was then removed and placed in an oven at 90° C. for 18 hours. A hard strong board was thus produced having properties as listed in the table below.

EXAMPLE II

Diallylidene pentaerythritol (63.6 parts by weight), sorbitol (10.8 parts by weight) and ethane sulfonic acid (0.65 part by weight) were stirred together at 90° C. until the mixture became homogeneous. It was then poured in a mold and cured at 80° C. for 18 hours. The panel, thus formed, had the physical properties as indicated in the table below.

Table

| Physical Test | Diallylidene pentaerythritol-sorbitol resin | |
| --- | --- | --- |
| | With Cellulose | Without Cellulose |
| Flexural Strength, p.s.i. | 15,290 | 12,530 |
| Heat Distortion Temp., °C | 129 | 47 |
| Rockwell Hardness | M-82 | M-65 |

It may therefore be seen that an improved material results where cellulose is used in combination with sorbitol.

While the invention has been described in its preferred aspect, it is to be understood that other procedures may also be used. For example, it is not essential to precure the resin in the absence of cellulose. If desired, cellulose may be added to the initial mixture and all ingredients may be cured together.

It is to be understood that the foregoing detailed description is merely given by way of illustration and that many variations may be made therein without departing from the spirit of my invention.

Having described my invention, what I desire to secure by Letters Patent is:

1. Process for the production of a resin which comprises combining an $a,\beta$-ethylenically unsaturated diacetal of an $\alpha,\beta$-ethylenically unsaturated aldehyde and a polyhydroxy compound selected from the group consisting of pentaerythritol and anhydroenneaheptitol with an amount, insufficient to cure the acetal completely, of a polyhydroxy alcohol containing at least two, but not more than six hydroxy groups, at least two hydroxy groups being separated from each other by a carbon bridge of at least three carbon atoms, precuring the thus obtained mixture by maintaining it in the presence of an acidic catalyst at a temperature above its fusion point and below about 100° C. for a period between 0.5 and 1.0 hour, thereafter combining the precured mixture with cellulose, and curing the thus obtained admixture by maintaining it in the presence of an acidic catalyst at a temperature between about 80° C. and 120° C. for a period between about 12 and 24 hours.

2. Process for the production of a resin which comprises combining an unsaturated diacetal prepared from pentaerythritol and a straight chain $a,\beta$-ethylenically unsaturated aldehyde having not more than four carbon atoms with an amount, insufficient to cure the acetal completely, of a polyhydroxy alcohol containing at least two, but not more than six hydroxy groups, at least two hydroxy groups being separated from each other by a carbon bridge of at least three carbon atoms, precuring the thus obtained mixture by maintaining it in the presence of an acidic catalyst at a temperature above its fusion point and below about 100° C. for a period between 0.5 and 1.0 hour, thereafter combining the precured mixture with cellulose, and curing the thus obtained admixture by maintaining it in the presence of an acidic catalyst at a temperature between about 80° C. and 120° C. for a period between about 12 and 24 hours.

3. Process for the production of a resin which comprises combining an unsaturated diacetal prepared from pentaerythritol and a straight chain $\alpha,\beta$-ethylenically unsaturated aldehyde having not more than four carbon atoms, with a polyhydroxy alcohol containing at least two, but not more than six hydroxy groups, at least two hydroxy groups being separated from each other by a carbon bridge of at least three carbon atoms, precuring the thus obtained mixture by maintaining it in the presence of an acidic catalyst at a temperature above its fusion point and below about 100° C. for a period between 0.5 and 1.0 hour, thereafter combining the precured mixture with cellulose, the reactants being present in the proportions of from about 0.4 to about 0.9 equivalent of polyhydroxy alcohol per equivalent of diacetal and from about 0.3 to about 2.0 equivalents of cellulose per equivalent of diacetal, in each case based upon hydroxy groups per double bond, and curing the thus obtained admixture by maintaining it in the presence of an acidic catalyst at a temperature between about 80° C. and 120° C. for a period between about 12 and 24 hours.

4. The process of claim 3 wherein the cellulose is in the form of wood flour.

5. The process of claim 3 wherein the cellulose is in the form of cellulose mats.

6. Process for the production of a resin which comprises combining an unsaturated diacetal prepared from pentaerythritol and an $\alpha,\beta$-ethylenically unsaturated aldehyde having not more than four carbon atoms with a hexahydroxy sugar alcohol in the proportion of from about 0.4 to about 0.9 equivalent of hexahydroxy alcohol per equivalent of diacetal based upon hydroxy groups per double bond, precuring the thus obtained admixture by maintaining it in the presence of an acidic catalyst at a temperature above its fusion point and below about 100° C. for a period between 0.5 and 1.0 hour thereafter combining the precured mixture with from about 0.3 to about 2.0 equivalents of cellulose per equivalent of diacetal based upon hydroxy groups per double bond, and curing the final admixture by maintaining it in the presence of an acidic catalyst at a temperature between about 80° C. and 120° C. for a period between about 12 and 24 hours.

7. Process for the production of a resin which comprises combining diallylidene pentaerythritol with sorbitol in the proportion of from about 0.4 to about 0.9 equivalent of sorbitol per equivalent of diallylidene pentaerythritol based upon hydroxy groups per double bond, precuring the thus obtained admixture by maintaining it in the presence of an acidic catalyst at a temperature above its fusion point and below about 100° C. for a period between 0.5 and 1.0 hour, thereafter combining the precured mixture with from about 0.3 to about 2.0 equivalents of cellulose per equivalent of diallylidene pentaerythritol, based upon hydroxy groups per double bond, and curing the final admixture by maintaining it in the presence of an acidic catalyst at a temperature between about 80° C. and 120° C. for a period between about 12 and 24 hours.

8. Process for the production of a resin which comprises combining dicrotonallylidene pentaerythritol with sorbitol in the proportion of from about 0.4 to about 0.9 equivalent of sorbitol per equivalent of dicrotonallylidene pentaerythritol based upon hydroxy groups per double bond, precuring the thus obtained admixture by maintaining it in the presence of an acidic catalyst at a temperature above its fusion point and below about 100° C. for a period between 0.5 and 1 hour, thereafter combining the precured mixture with from about 0.3 to about 2.0 equivalents of cellulose per equivalent of dicrotonallylidene pentaerythritol based upon hydroxy groups per double bond, and curing the final admixture by maintaining it in the presence of an acidic catalyst at a temperature between about 80° C. and 120° C. for a period between about 12 and 24 hours.

9. A cured reaction product of an $\alpha,\beta$-ethylenically unsaturated diacetal of an $\alpha,\beta$-ethylenically unsaturated aldehyde and a polyhydroxy compound selected from the group consisting of pentaerythritol and anhydroenneaheptitol with an amount, insufficient to cure the acetal completely, of a polyhydroxy alcohol containing at least two, but not more than six hydroxy groups, at least two hydroxy groups being separated from each other by a carbon bridge of at least three carbon atoms, and with cellulose.

10. A cured reaction product of an unsaturated diacetal prepared from pentaerythritol and a straight chain $\alpha,\beta$-ethylenically unsaturated aldehyde having not more than four carbon atoms, with an amount, insufficient to cure the acetal completely, of a polyhydroxyl alcohol containing at least two, but not more than six hydroxy groups, at least two hydroxy groups being separated from each other by a carbon bridge of at least three carbon atoms, and with cellulose.

11. A cured reaction product of an unsaturated diacetal prepared from pentaerythritol and an $\alpha,\beta$-ethylenically unsaturated aldehyde having not more than four carbon atoms, with from about 0.4 to about 0.9 equivalent per equivalent of diacetal, based upon hydroxy groups per double bond, of a polyhydroxy alcohol containing at least two but not more than six hydroxy groups, at least two hydroxy groups being separated from each other by a carbon bridge of at least three carbon atoms, and with from about 0.3 to about 2.0 equivalents of cellulose per equivalent of unsaturated diacetal, based upon hydroxy groups per double bond.

12. A cured reaction product of an unsaturated diacetal prepared from pentaerythritol and an $\alpha,\beta$-ethylenically unsaturated aldehyde having not more than four carbon atoms with from about 0.4 to about 0.9 equivalent of a hexahydroxy sugar alcohol per equivalent of diacetal, based upon hydroxy groups per double bond, and with from about 0.3 to about 2.0 equivalents of cellulose per equivalent of unsaturated diacetal, based upon hydroxy groups per double bond.

13. A cured reaction product of diallylidene pentaerythritol with from about 0.4 to about 0.9 equivalent of sorbitol per equivalent of diallylidene pentaerythritol, based upon hydroxy groups per double bond, and with from about 0.3 to about 2.0 equivalents of cellulose per equivalent of unsaturated diacetal, based upon hydroxy groups per double bond.

14. A cured reaction product of dicrotonallylidene pentaerythritol with from about 0.4 to about 0.9 equivalent of sorbitol per equivalent of dicrotonallylidene pentaerythritol, based upon hydroxy groups per double bond, and with from about 0.3 to about 2.0 equivalents of cellulose per equivalent of unsaturated diacetal, based upon hydroxy groups per double bond.

References Cited in the file of this patent

UNITED STATES PATENTS

| | | |
|---|---|---|
| 2,467,430 | Izard | Apr. 19, 1949 |
| 2,527,853 | Roach et al. | Oct. 31, 1950 |
| 2,569,932 | Izard | Oct. 2, 1951 |
| 2,687,407 | Orth | Aug. 24, 1954 |
| 2,785,996 | Kress | Mar. 19, 1957 |

FOREIGN PATENTS

| | | |
|---|---|---|
| 838,827 | Germany | May 12, 1952 |